United States Patent
Kwong et al.

(10) Patent No.: US 7,543,194 B2
(45) Date of Patent: Jun. 2, 2009

(54) TEST HARNESS BENCHMARK FILE

(75) Inventors: Man K. Kwong, Naperville, IL (US);
Roberta C. Kwong, Naperville, IL (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 591 days.

(21) Appl. No.: 10/909,549

(22) Filed: Aug. 2, 2004

(65) Prior Publication Data
US 2006/0026465 A1 Feb. 2, 2006

(51) Int. Cl.
*G06F 11/00* (2006.01)
(52) U.S. Cl. .................................................. 714/48
(58) Field of Classification Search ............. 714/38
See application file for complete search history.

(56) References Cited

U.S. PATENT DOCUMENTS

| | | | | |
|---|---|---|---|---|
| 5,781,720 A | * | 7/1998 | Parker et al. | 714/38 |
| 6,047,389 A | * | 4/2000 | Thai | 714/38 |
| 6,058,493 A | * | 5/2000 | Talley | 714/38 |
| 6,067,639 A | * | 5/2000 | Rodrigues et al. | 714/38 |
| 6,931,357 B2 | * | 8/2005 | Richard et al. | 702/188 |
| 6,966,013 B2 | * | 11/2005 | Blum et al. | 714/38 |
| 7,076,713 B1 | * | 7/2006 | Hess | 714/741 |
| 7,222,269 B2 | * | 5/2007 | Kurinami et al. | 714/47 |
| 2004/0088602 A1 | * | 5/2004 | Cohen et al. | 714/38 |
| 2004/0153831 A1 | * | 8/2004 | Kuth | 714/38 |

* cited by examiner

*Primary Examiner*—Scott T Baderman
*Assistant Examiner*—Paul F. Contino (57) ABSTRACT

A test harness that comprises one or more tests for a program in one example is executed. An output from the test harness is received. The output comprises one or more respective test results for the one or more tests. A verification that the one or more respective test results comprise one or more expected test results for the one or more tests is received from a user. The one or more expected test results are stored in a benchmark file. A test harness for benchmark file generation that comprises one or more tests for a program in a further example is created. The test harness comprises one or more calls to one or more subroutines that are employable for one or more of: a definition of one or more expected test results for the one or more tests; and/or a verification of the one or more expected test results.

20 Claims, 5 Drawing Sheets

| Prior Art | New Invention |
|---|---|
| ...    [ Lines to set up the<br>...      environment for the<br>...      tests ] | ...<br>use ModTest;<br>...    [ Lines to set up the<br>...      environment for the<br>...      tests ] |
| # test 1<br>...    [ Lines that invoke a<br>...      subroutine to determine<br>...      the scalar $s ]<br>Lines used to define the value<br>     [which can be one or<br>     Possibly multiple lines]<br>of the expected result, e.g.<br>$s_expected = "This is the output<br>   value from the subroutine being<br>   invoked";<br>...<br>if ($s equal to $s_expected) {<br>   TEST PASSES; }<br>else {<br>   TEST FAILS;<br>} | # test 1<br>...    [ Lines that invoke a<br>...      subroutine to determine<br>...      the scalar $s ]<br><br><br><br><br><br><br><br><br><br>t4s $s;   [ this is all that's needed ] |
| # test 2<br>...    [ Lines that invoke a<br>...      subroutine to determine<br>...      the array @a ]<br>Lines used to define the value<br>of the expected result, e.g.<br>@a_expected = (<br>   "first member",<br>   "second member",<br>   ...,<br>   "last member");<br>if (every member of @a is equal to<br>     every member of @a_expected) {<br>   TEST PASSES; }<br>else {<br>   TEST FAILS;<br>} | # test 2<br>...    [ Lines that invoke a<br>...      subroutine to determine<br>...      the array @a ]<br><br><br><br><br><br><br><br><br>t4a @a;<br><br>... |
| # test N<br>...    [ Lines that invoke a<br>...      subroutine to determine<br>...      the hash variable @h ]<br>Lines used to define the value<br>of the expected result, e.g.<br>@h_expected = (<br>   key1 => "associated value_1",<br>   key2 => "associated value_2",<br>   ...,<br>   key_n => "associated value_n"<br>);<br>if (for every key of @h, the associated<br>     value is equal to the corresponding<br>     value of @h_expected of the same key)<br>{<br>   TEST PASSES; }<br>else {<br>   TEST FAILS;<br>} | # test N<br>...    [ Lines that invoke a<br>...      subroutine to determine<br>...      the hash variable @h ]<br><br><br><br><br><br><br><br><br><br><br><br>t4h %h; |

207, 209, 211, 213 (Prior Art callouts); 215, 217, 219, 221, 223 (New Invention callouts)

TEST HARNESS BENCHMARK FILE

TECHNICAL FIELD

The invention relates generally to software and more particularly to testing of software.

BACKGROUND

A test harness comprises a collection of tests designed to verify proper behavior of a program. A test establishes an environment for the program, invokes one or more subroutines of the program, and compares one or more results of the subroutines to one or more expected results for the subroutines. The one or more expected results are hard-coded into the test. As one shortcoming, the expected results for the subroutines must be known when designing the test. It is desirable for the test harness to be developed independently from the determination of the expected results.

As another shortcoming, adjustments to the subroutines of the program require modifications to the test harness. For example, a test designer spends time manually computing new expected results for the subroutines based on the adjustments to the subroutines. The test designer must then manually update the expected values of the tests of the test harness with the new expected results. For example, the test designer must hard-code the new results into the test, which adds additional lines of code. The additional lines of code increase a margin of error for the test harness and increase difficulty of debugging the test harness.

Thus, a need exists for providing a reduction in time and/or effort required to develop and maintain one or more test harnesses for one or more programs. A further need exists for providing a reduction in number of lines of code for test harnesses.

SUMMARY

The invention in one implementation encompasses a method. An execution of a test harness that comprises one or more tests for a program is performed. An output that comprises one or more respective test results for the one or more tests is received from the test harness. A verification that the one or more respective test results comprise one or more expected test results for the one or more tests is received from a user. The one or more expected test results are stored in a benchmark file.

Another implementation of the invention encompasses a method. One or more benchmark files of a program are generated through employment of one or more results obtained from the program during execution of one or more tests on the program.

Yet another implementation of the invention encompasses an apparatus. The apparatus comprises a test control component that generates one or more benchmark files of a program through employment of one or more results obtained from the program during execution of one or more tests on the program.

Another implementation of the invention encompasses a method. A test harness for benchmark file generation that comprises one or more tests for a program is created. The test harness comprises one or more calls to one or more subroutines that are employable for one or more of: a definition of one or more expected test results for the one or more tests; and/or a verification of the one or more expected test results.

DESCRIPTION OF THE DRAWINGS

Features of exemplary implementations of the invention will become apparent from the description, the claims, and the accompanying drawings in which:

FIG. 2 is a representation of the test harness developed through employment of the test control component of the apparatus of FIG. 1.

DETAILED DESCRIPTION

Figure 1:
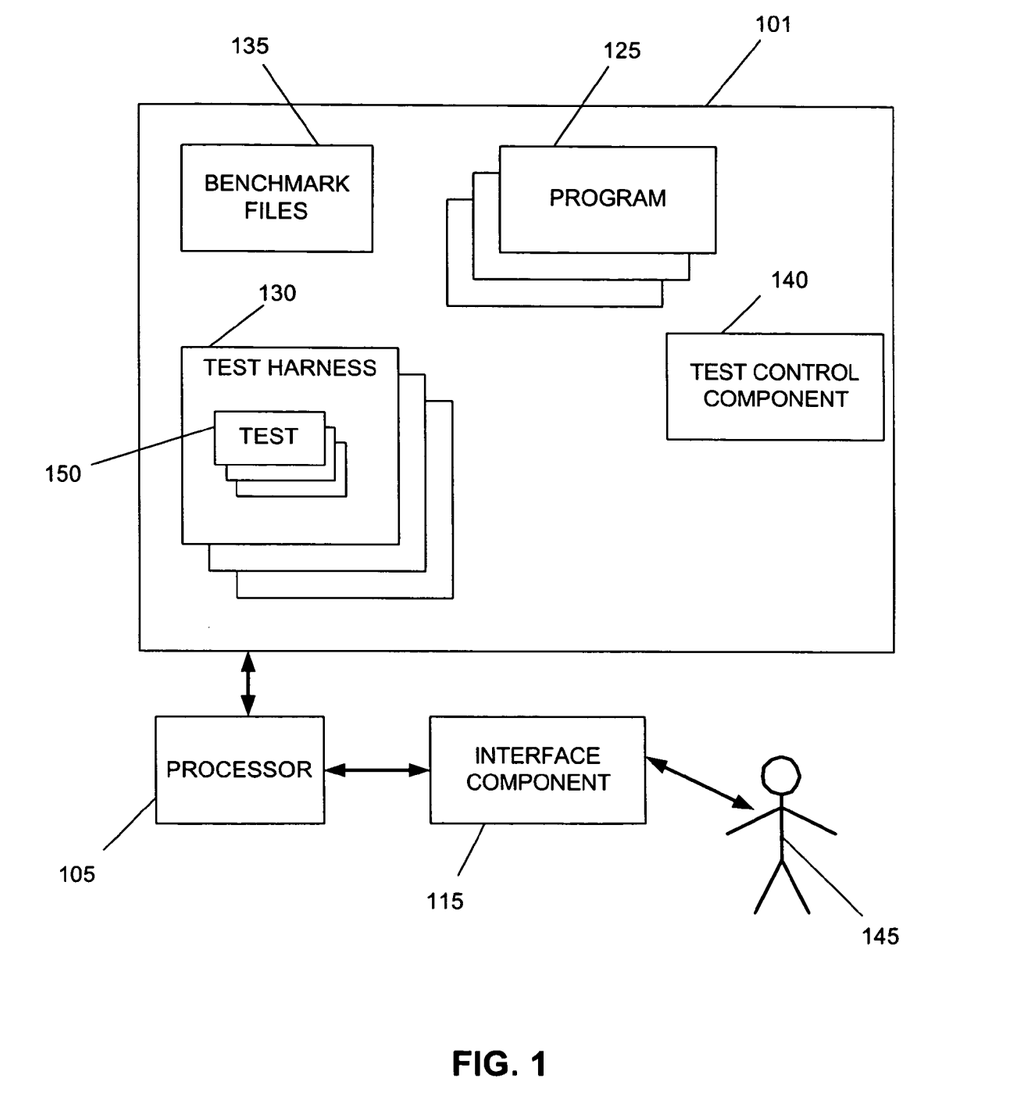
FIG. 1 is a representation of one implementation of an apparatus that comprises one or more storage devices, one or more processors, one or more interface components, one or more programs, one or more test harnesses, one or more benchmark files, and one or more test control components.

Turning to FIG. 1, an apparatus 100 in one example comprises one or more storage devices 101, one or more processors 105, and one or more interface components 115. The processors 105 in one example comprises a central processor unit ("CPU"). The processor 105 executes one or more instructions of one or more programs 125, one or more test harnesses 130, and a test control component 140. The programs 125 and the test harnesses 130 in one example comprise one or more scripting languages, for example, one or more perl modules. The program 125 in one example comprise one or more subroutines and one or more variables, as will be understood by those skilled in the art. The storage device 101 in one example comprises an instance of a recordable data storage medium, as described herein. The storage device 101 stores the programs 125, the test harnesses 130, one or more benchmark files 135, and one or more test control components 140.

The interface component 115 in one example comprises a command line interface. The interface component 115 in one example comprises a graphical user interface ("GUI"). In one example, the interface component 115 allows a user 145 to execute one or more of the test harnesses 130 on the programs 125. In another example, the interface component 115 allows the user 145 to verify one or more results of one or more variables of the program 125. In yet another example, the interface component 115 allows the user 145 to benchmark one or more tests 150 of the test harness 140 for the program 125.

The test harness 130 comprises one or more tests 150 to verify one or more current results of one or more variables of the program 125. The test harness 130 in one example establishes a testing environment for the program 125. The test harness 130 employs the tests 150 to invoke one or more of the subroutines of the program 125 to obtain the current results of the variables of the program 125. The benchmark files 135 in one example comprise one or more expected results for the variables of the program 125 during execution of one or more tests of the test harness 130. The benchmark files 135 in one example comprise one or more portions of the one or more tests 150. Each of the portions of the benchmark files 135 comprises one or more expected results for the variables obtained by the test 150. The benchmark files 135 in one example comprise one or more snapshots of expected behavior for the program 125. The benchmark files 135 enable regression testing of the program 125, as will be understood by those skilled in the art.

The test control component 140 in one example comprises a perl module. The test control component 140 provides for a reduction in the time required by the user 145 to develop a test harness, for example, the test harness 130, for a program, for example the program 125. The test control component 140 comprises one or more subroutines for reducing the time required by the user 145 to develop the test harness 130. The subroutines in one example obtain results of one or more variables and/or data structures from the program 125. The subroutines of the test control component 140 in one example employ a perl utility, for example, DataDumper, to obtain a result of any data structure in a textual format.

The test control component 140 in one example comprises one or more data type subroutines, for example, perl subroutines, to obtain current results for scalar, array, and hash data types. The test control component 140 comprises a benchmark file subroutine. The benchmark file subroutine in one example runs the tests in a harness file and carries out benchmarking if appropriate. The benchmark file subroutine opens an output file generated by the tests in the harness file, reads content of the output file, closes the output file, and carries out benchmarking if appropriate. The test control component 140 comprises a printed message subroutine. The printed message subroutine in one example captures one or more messages printed to the interface component 115 by the tests in the harness file. The printed message subroutine tests the messages and then benchmarks the messages if appropriate. The test control component 140 comprises a date removal subroutine. The date removal subroutine in one example replaces one or more date-formatted strings with 'z' characters. The date removal subroutine is useful in situations where the results will be different for every invocation of the test 150. For example, results stored with a timestamp will vary for each invocation of the test 150.

Turning to FIG. 2, when designing the tests 150 of the test harness 130, the user 145 employs the one or more subroutines of the test control component 140 to reduce the number of lines coded in the tests 150. For example, FIG. 2 comprises an exemplary prior art test harness 205 and the test harness 130. The prior art test harness 205 and the test harness 130 comprise three tests: test 1, test 2, and test 3. The prior art test harness 205 comprises command groupings 207, 209, 211, and 213. Command grouping 207 sets up an environment for the prior art test harness 205. Command grouping 209 comprises one or more lines to define an expected result of a variable of test 1, for example, scalar value s. For example, the command grouping 209 comprises a hard-coded expected result for the scalar value s. Command grouping 209 comprises one or more lines to obtain a current result of the scalar value s. Command grouping 209 comprises one or more lines to compare the current result of the scalar value s with the expected result of the scalar value s.

Command grouping 211 comprises one or more lines to define an expected result of a variable of test 2, for example, array value a. For example, the command grouping 211 comprises a hard-coded expected result for the array value a. Command grouping 211 comprises one or more lines to obtain a current result of the array value a. Command grouping 211 comprises one or more lines to compare the current result of the array value a with the expected result of the array value a. Command grouping 213 functions in a similar manner as command groupings 209 and 211, for the hash value h.

The test harness 130 comprises one or more command groupings 215, 217, 219, 221, and 223. The command grouping 215 comprises a directive statement to include the test control component 140. The command grouping 217 sets up an environment for the test harness 130. Command grouping 219 comprises a line to invoke a first subroutine of the test control component 140, for example, a subroutine to test and benchmark the scalar value s. Command grouping 221 comprises a line to invoke a second subroutine of the test control component 140, for example, a subroutine to test and benchmark the array value a. Command grouping 223 comprises a line to invoke a third subroutine of the test control component 140, for example, a subroutine to test and benchmark the hash value h. The test harness 130 lacks any hard-coded expected results for the variables of the tests 1, 2, and 3.

Referring back to FIG. 1, the test control component 140 receives one or more command arguments from the user 145 via the interface component 115. The command arguments in one example comprise one or more execution command arguments, one or more benchmark command arguments, and one or more forcemark command arguments. The test control component 140 provides one or more results of one or more variables of the program 125 to the user 145 through employment of the interface component 115. The test control component 140 employs the interface component 115 to obtain verification of the results of the variables of the program 125. For example, the interface component 115 comprises GUI. The GUI comprises a text box for a result and a text box for the variable of the program 125. The GUI comprises an "Accept" button and a "Decline" button. The text control component 140 provides the result and the name of the variable to the interface component 115. The user 145 presses the "Accept" button to verify the result of the variable. The user 145 presses the "Decline" button to reject the result of the variable.

In one example, the test control component 140 cooperates with the processor 105 to execute the test harness 130 on the program 125 upon receipt of an execution command argument. The test control component 140 in one example provides one or more results of one or more variables of the program 125 to the user 145 via the interface component 115 during execution of the test harness 130 on the program 125. The processor 105 retrieves the test harness 130 from the storage component 101. The processor 105 executes the instructions of the test harness 130. The processor 105 executes a subroutine of the test control component 140. The test control component 140 obtains a result for a variable of the program 125. The test control component 140 provides the result of the variable of the program 125 to the user 145 through employment of the interface component 115. The test control component 140 obtains a verification of the result of the variable of the program 125 from the user 145 through employment of the interface component 115. For example, the test control component 140 provides a result, for example, "hello world" of a variable, for example, a message variable, to the user 145. The user 145 compares the "hello world" to an expected value of the greeting variable and presses an "Accept" button on the GUI of the interface component 115 to accept the result of the greeting variable.

In another example, the test control component 140 cooperates with the processor 105 automatically generate the benchmark file 135 for the test harness 130 upon receipt of a benchmark command. The test control component 140 generates one or more portions of the benchmark file 135 for each test 150 within the test harness 130. Each of the portions of the benchmark file 135 comprise one or more expected results for the variables of the program 125 invoked by the test 150. The test control component 140 associates the portions of the benchmark file 135 with an identifier of the test 150. The identifier of the test 150 in one example comprises a test name. The test control component 140 receives the results of the variables of the program 125 from the subroutines of the tests 150. The test control component 140 incorporates the results of the variables of the program 125 into the portion of the benchmark file 135 associated with the test name. For example, the user 145 employs the interface component 115 to select one or more tests 150 to benchmark in the test harness 140. The test control component 140 cooperates with the processor 105 to execute the selected one or more tests 150. The test control component 140 generates one or more portions of the benchmark file 135 for the selected one or more tests 150.

The test control component 140 updates one or more portions of the benchmark file 135. The test control component 140 determines existence of the portions of the benchmark file 135 for the test 150. Where the portions of the benchmark file 135 for the test 150 exist, the test control component 140 updates one or more results for one or more variables of the one or more portions of the benchmark file 135.

The test control component 140 generates one or more versions of the benchmark file 135 for the test harness 130. For example, the test control component 140 generates a first version of the benchmark file 135 at a first execution time and a second version of the benchmark file 135 at a second execution time. If desired, the user 145 may select to employ a previous version of the benchmark file 130, for example, the first version of the benchmark file 135 from the first execution time, for use in regression testing of the program 125. The user 145 in one example performs an interaction with the interface component 115 to select a version of the benchmark file 135 for employment in regression testing of the program 125.

In yet another example, the test control component 140 generates the benchmark file 135 for the test harness 130 upon receipt of a forcemark command. The test control component 140 generates the benchmark file 135 for the test harness 130. The test control component 140 deletes one or more previous versions of the benchmark file 135 for the test harness 130.

The test control component 140 in one example employs the benchmark files 135 to perform regression testing on the program 125. The processor 105 executes the test 150 of test harness 130 on the program 125. The test control component 140 obtains a current result of a variable invoked by a subroutine of the test control component 140 from the program 125. The test control component 140 employs an identifier of the test 150 to obtain the portion of the benchmark file 135. The test control component 140 employs the subroutine to obtain a name of the variable. The test control component 140 employs the name of the variable to identify the expected result of the variable within the portion of the benchmark file 135. The test control component 140 executes the expected result of the variable to obtain a result of the variable for the current invocation. For example, the test control component 140 evaluates the textual format of the expected result to obtain an expected result for the current invocation of the test harness 130 for the program 125 through employment of the DataDumper. The test control component 140 compares the current result of the variable with the expected result of the variable for the current invocation.

An illustrative description of exemplary operation of the apparatus 100 is presented, for explanatory purposes.

Figure 3:
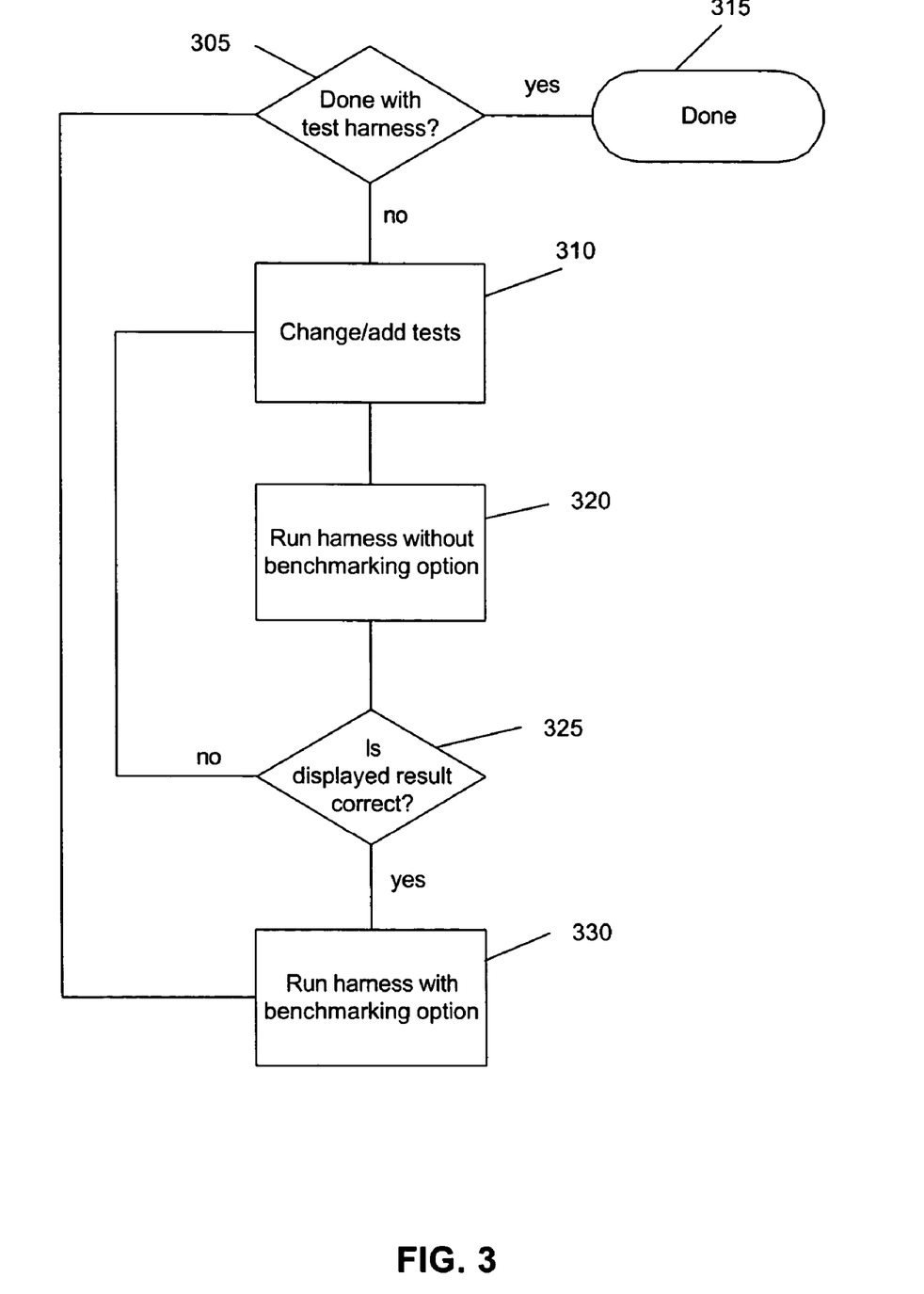
FIG. 3 is an exemplary process flow of generating the benchmark files of the apparatus of FIG. 1.

Turning to FIG. 3, the user 145 in one example creates a test harness 130. For each test 150 of the test harness 130, the user 145 proceeds to STEP 305. Upon verifying and benchmarking all tests 150 within the test harness 130, the user 145 proceeds to STEP 315. In STEP 310, the user 145 modifies and/or adds tests to the test harness 130. In STEP 320, the user 145 invokes the execute command argument from the interface component 115. The processor 105 executes the test harness 130 on the program 125. In STEP 325, the test control component 140 provides the results of the variables of the program 125 to the interface component 115. The interface component 115 provides the results to the user 145. Where the user 145 accepts the results of the variables of the program 125 during execution of the test harness 130, the user 145 proceeds to STEP 330. Where the user 145 rejects the results of the program 125 during execution of the test harness 130, the user 145 proceeds to STEP 310. In STEP 330, the user 145 invokes the benchmark command from the interface component 115. The test control component 140 executes the test harness 130 on the program 125 and generates the benchmark file 125 for the test harness 130. STEP 330 proceeds to STEP 305.

Figure 4:
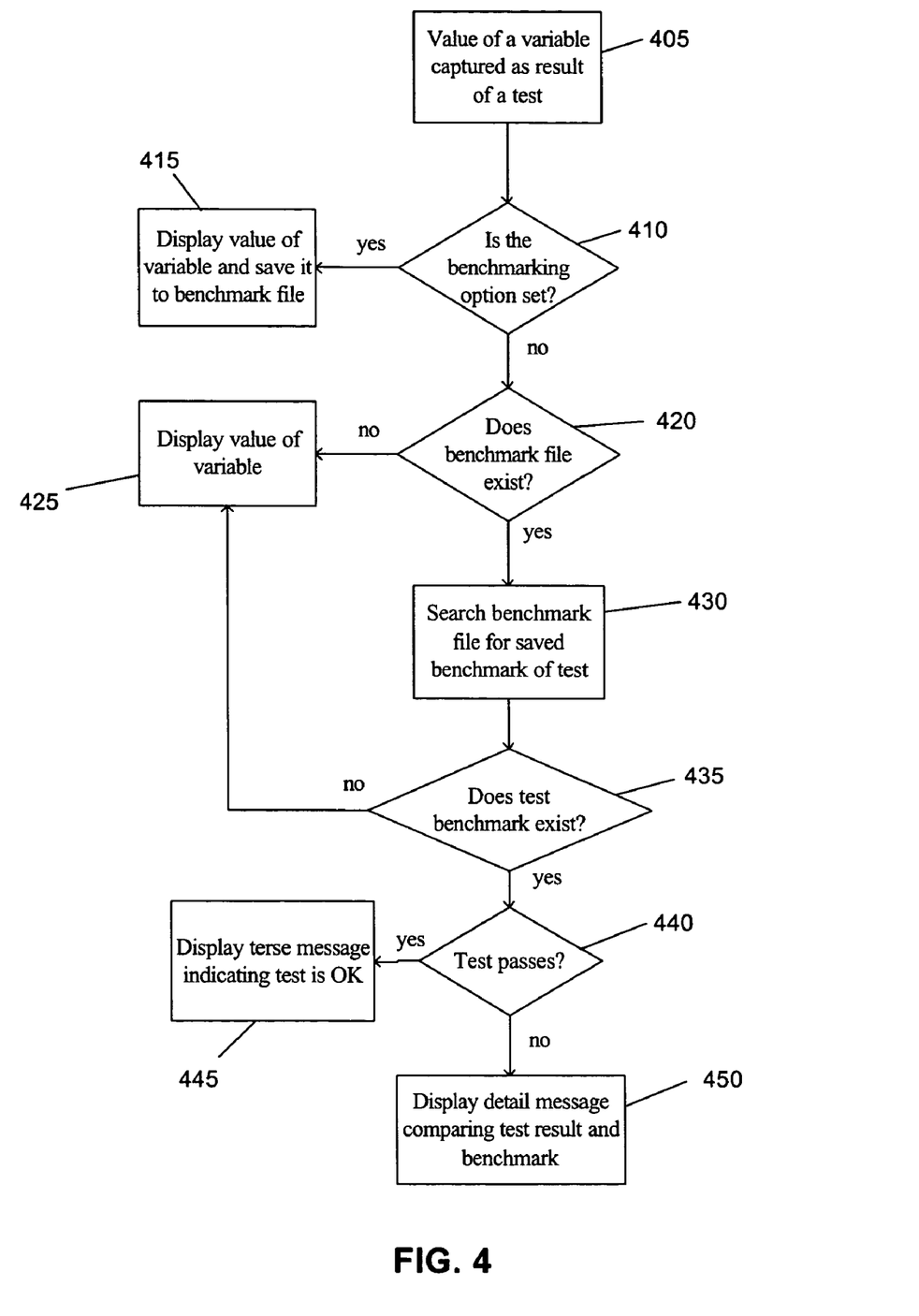
FIG. 4 is an exemplary process flow of benchmarking the program of the apparatus of FIG. 1.

Turning to FIG. 4, the processor 105 executes the test harness 130. In STEP 405, the processor 105 obtains a result from the program 125 during execution of the test harness 130. In STEP 410, the processor 105 checks if the benchmarking option is set. Where the benchmarking option is set, the processor 105 proceeds to STEP 415. Where the benchmarking option is not set, the processor 105 proceeds to STEP 420.

In STEP 415, the processor 105 cooperates with the interface component 115 to display the result of the variable of the program to the user 145. The processor 105 cooperates with the test control component 140 to save the result of the variable of the program in the benchmark file 135. In STEP 420, the processor 105 cooperates with the test control component 104 to determine existence of the benchmark file 135. Where the benchmark file 135 does not exist, the processor 105 proceeds to STEP 425. Where the benchmark file 135 exists, the processor 105 proceeds to STEP 430.

In STEP 425, the processor 105 cooperates with the interface component 115 to display the result of the variable to the user 145. In STEP 430, the test control component 140 searches the benchmark file 135 for the expected result of the variable of the program under execution of the test harness 130. In STEP 435, the test control component 140 determines the existence of the expected result within the benchmark file 135. For example, the test control component 140 determines if the expected result has previously been written to the benchmark file 135. Where the expected result does not exist, the processor 105 proceeds to STEP 425. Where the benchmark file 135 exists, the processor 105 proceeds to STEP 440.

In STEP 440, the test control component 140 compares the result for the variable to the expected result for the variable. Where the result for the variable matches the expected result for the variable, the processor 105 proceeds to STEP 445. Where the result for the variable fails to match the expected result for the variable, the processor 105 proceeds to STEP 450.

In STEP 445, the test control component 140 cooperates with the interface component 115 to provide a message indicating that the test passed to the user 145. The message in one example comprises a terse message, for example, "Test OK," or another suitable message that can be quickly read and understood by the user 145. In STEP 450, the test control component 140 cooperates with the interface component 115 to provide to the user 145 a message comparing the result for the variable to the expected result for the variable from the benchmark file 135. The message in one example is a detailed message that describes the test failure to the user 145, as will be appreciated by those skilled in the art.

Figure 5:
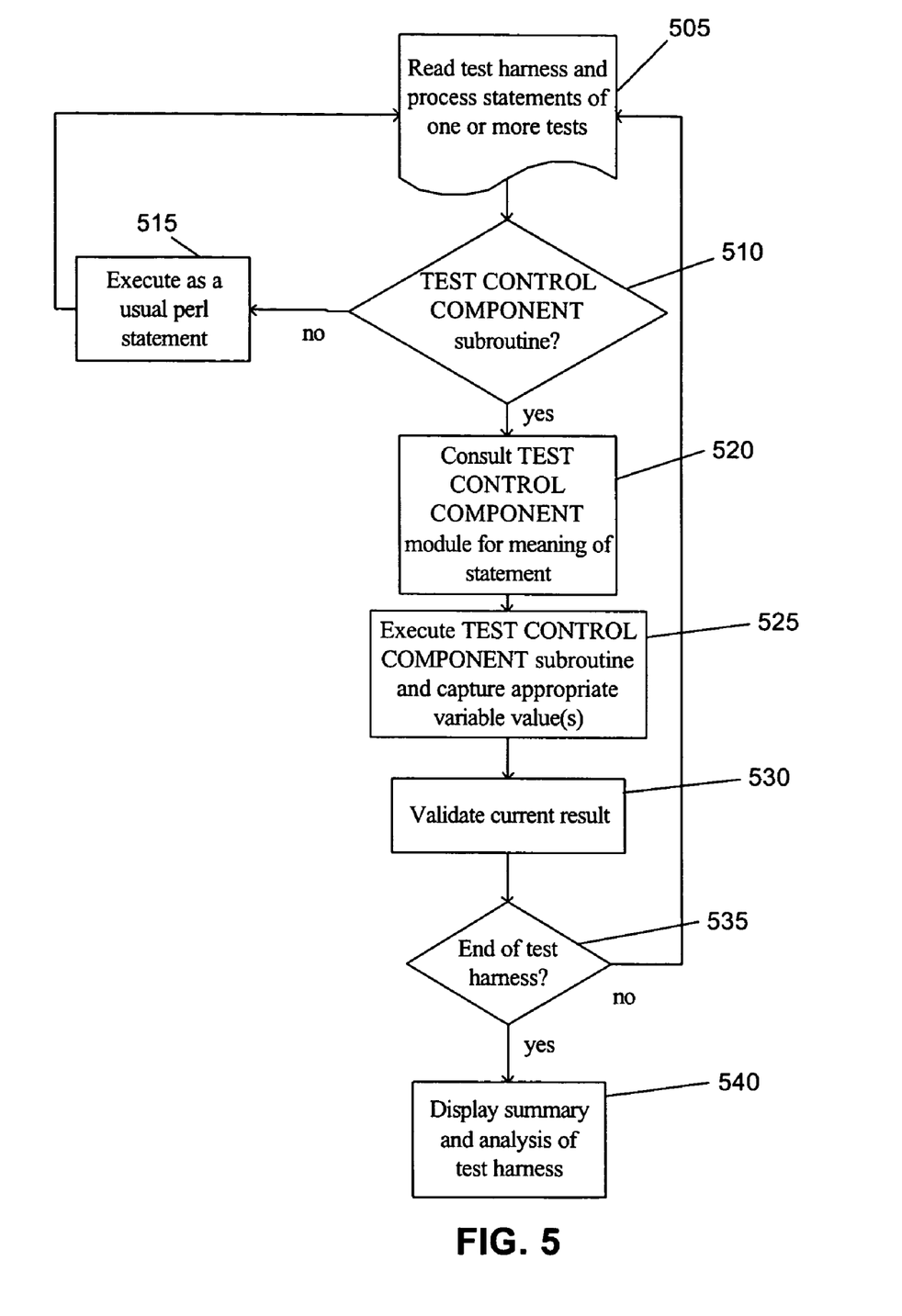
FIG. 5 is an exemplary process flow of processing the test harness through employment of the test control component of the apparatus of FIG. 1.

Turning to FIG. 5, the user 145 performs a regression test on the program 125. In STEP 505, the processor 105 reads the test harness 130 and executes one or more statements of the one or more tests 150 of the test harness 130. In STEP 510, the processor 105 evaluates a statement of the test 150 of the test harness 130. Where the statement of the test harness 130 invokes a subroutine of the test control component 140 on a variable of the program 125, the processor 105 proceeds to STEP 520. Where the statement of the test harness 130 fails to invoke a subroutine of the test control component 140 on a variable of the program 125, the processor 105 proceeds to STEP 515. In STEP 515, the processor 105 executes the statement as a usual perl statement.

In STEP 520, the processor 105 communicates with the test control component 140 to execute the subroutine on the variable of the program 125. In STEP 525, the processor 105 executes the subroutine on the variable of the program 125 and obtains the current result of the variable of the program 125. In STEP 530, the test control component 140 obtains one or more expected results from the benchmark file 135. The test control component 140 compares the current result of the subroutine on the variable of the program 125 with the expected result from the benchmark file 135. In STEP 535, the processor 105 makes a determination of the completion of the test harness 130. Where the test harness 130 comprises additional tests 150, the processor 105 proceeds to STEP 505. Where the processor 105 has executed the tests 150 of the test harness 130 to completion, the processor 105 proceeds to STEP 540. In STEP 540, the test control component 140 provides a summary of results of the tests 150 of the test harness 130 to the interface component 115. The interface component 115 provides the summary of results to the user 145.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art. The apparatus 100 in one example comprises any (e.g., horizontal, oblique, or vertical) orientation, with the description and figures herein illustrating one exemplary orientation of the apparatus 100, for explanatory purposes.

The apparatus 100 in one example employs one or more computer-readable signal-bearing media. The computer-readable signal-bearing media store software, firmware and/or assembly language for performing one or more portions of one or more embodiments of the invention. Examples of a computer-readable signal-bearing medium for the apparatus 100 comprise the storage component 101. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory. In another example, the computer-readable signal-bearing medium comprises a network. The network in one example is configured to transmit a modulated carrier signal. The network in one example comprises or is coupled with the apparatus 100, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method, comprising the steps of:
    performing a first execution of a test harness for a program, wherein the test harness comprises one or more tests;
    receiving a first output, from the first execution of the test harness through employment of a data type subroutine of a test control component, that comprises one or more respective first test results for the one or more tests for the program;
    capturing one or more messages printed to an interface component by the tests in the test harness, testing the one or more messages, and benchmarking the one or more messages through employment of a printed message subroutine of the test control component;
    replacing one or more date-formatted strings with alternative strings through employment of a date removal subroutine of the test control component;
    displaying the one or more respective first test results to a user without the user performing the one or more tests;
    receiving a verification, from the user, that the one or more respective first test results comprise one or more expected test results for the one or more tests for the program;
    storing the one or more respective first test results in a benchmark file;
    performing a second execution of the test harness for the program;
    receiving a second output, from the second execution of the test harness, that comprises one or more respective second test results for the one or more tests;
    opening an output file generated by the one or more tests, reading contents of the file, and closing the output file through employment of a benchmark file subroutine of the test control component;
    performing a comparison of the one or more first test results of the benchmark file with the one or more respective second test results;
    displaying one or more messages to the user based on the comparison of the one or more first test results of the benchmark file with the one or more respective second test results.

2. The method of claim 1, wherein the step of displaying the one or more messages to the user based on the comparison of the one or more first test results of the benchmark file with the one or more respective second test results comprises the step of:
    displaying a terse message to the user upon a comparison of one expected test result, of the one or more expected test results, with one second test result, of the one or more second test results, that indicates a match of the one expected test result and the one second test result.

3. The method of claim 1, wherein the step of displaying the one or more messages to the user based on the comparison of the one or more first test results of the benchmark file with the one or more respective second test results comprises the step of:

displaying a detailed message to the user upon a comparison of one expected test result, of the one or more expected test results, with one second test result, of the one or more second test results, that indicates a failed match of the one expected test result and the one second test result.

4. The method of claim 1, further comprising the step of:

creating the test harness, wherein the test harness comprises one or more calls to one or more subroutines that are employable for one or more of:

a definition of the one or more expected test results; and/or a verification of the one or more expected test results.

5. A method, comprising the step of:

generating one or more benchmark files for a program through employment of one or more first results obtained from the program during a first execution of one or more tests on the program; and comparing the one or more benchmark files with one or more second results obtained from the program during a second execution of the one or more tests on the program;

wherein the step of generating the one or more benchmark files comprises the steps of:

performing a first execution of a test harness for a program, wherein the test harness comprises one or more tests;

receiving a first output, from the first execution of the test harness through employment of a data type subroutine of a test control component, that comprises one or more respective first test results for the one or more tests for the program;

capturing one or more messages printed to an interface component by the tests in the test harness, testing the one or more messages, and benchmarking the one or more messages through employment of a printed message subroutine of the test control component;

replacing one or more date-formatted strings with alternative strings through employment of a date removal subroutine of the test control component;

displaying the one or more first results to a user without the user performing the one or more tests;

receiving a verification from a user that the one or more first results obtained from the program comprise expected results; and storing the one or more respective first test results in a benchmark file;

wherein the step of comparing the one or more benchmark files with one or more second results obtained from the program during the second execution of the one or more tests on the program comprises the steps of:

performing a second execution of the test harness for the program;

receiving a second output, from the second execution of the test harness, that comprises one or more respective second test results for the one or more tests;

opening an output file generated by the one or more tests, reading contents of the file, and closing the output file through employment of a benchmark file subroutine of the test control component;

performing a comparison of the one or more first test results of the benchmark file with the one or more respective second test results; and displaying one or more messages to the user based on the comparison of the one or more first test results of the benchmark file with the one or more respective second test results.

6. The method of claim 5, wherein the step of generating the one or more benchmark files of the program through employment of the one or more results obtained from the program during execution of the one or more tests on the program comprises the steps of:

generating one or more textual results from the one or more results; and generating the one or more benchmark files based on the one or more textual results.

7. The method of claim 6, wherein the step of generating the one or more benchmark files based on the one or mare textual results comprises the steps of:

making one or more associations between the one or more textual results and the one or more tests; and incorporating the one or more textual results into one or more portions of the one or more benchmark files through employment of the one or more associations.

8. The method of claim 7, wherein the step of incorporating the one or more textual results into the one or more portions of the one or more benchmark files through employment of the one or more associations comprises the step of:

employing one or more identifiers of the one or more tests to incorporate the one or more textual results into the one or more portions of the one or more benchmark files.

9. The method of claim 5, further comprising the step of:

obtaining the one or more results from the program during execution of the one or more tests on the program.

10. The method of claim 5, wherein the program comprises one or more first subroutines and one or more data structures, wherein the step of obtaining the one or more results from the program during execution of the one or more tests on the program comprises the steps of:

executing the one or more tests on the program, wherein the one or more tests comprise one or more second subroutines;

executing the one or more first subroutines on the one or more data structures of the program during execution of the one or more second subroutines of the one or more tests on the program; and obtaining the one or more results as one or more outputs of the one or more first subroutines.

11. The method of claim 5, wherein the one or more benchmark files comprise one or more portions, wherein the step of generating the one or more benchmark files of the program through employment of the one or more results obtained from the program during execution of the one or more tests on the program comprises the step of:

generating one or more portions of one or more of the one or more benchmark files at one or more execution times.

12. The method of claim 11, wherein the one or more execution times comprise a first execution time and a second execution time, wherein the one or more portions comprise a first one or more portions and a second one or more portions, the method further comprising the steps of:

generating at the first execution time, the first one or more portions of the one or more benchmark files; and generating at the second execution time, the second one or more portions of the one or more benchmark files.

13. The method of claim 12, further comprising the step of:

updating the first one or more portions of the one or more benchmark files with the second one or more portions of the one or more benchmark files.

14. The method of claim 11, wherein the one or more portions comprise a first one or more portions, wherein the one or more execution times comprise a first execution time and a second execution time, the method further comprising the steps of:
- obtaining at the first execution time, the one or more results from the program during execution of the one or more tests;
- generating the first one or more portions based on the one or more results obtained at the first execution time;
- obtaining at the second execution time, one or more results from the program during execution of the one or more tests;
- generating a second one or more portions based on the one or more results obtained at the second execution time; and
- updating the first one or more portions with the second one or more portions.

15. The method of claim 5, wherein the one or more results comprise a first one or more results, wherein one or more portions of the one or more benchmark files comprise the first one or more results, the method further comprising the step of:
- employing the one or more portions of the one or more benchmark files to verify a second one or more results obtained from the program during execution of one or more of the one or more tests on the program.

16. The method of claim 15, wherein the step of employing the one or more portions of the one or more benchmark files to verify the second one or more results obtained from the program during execution of the one or more of the one or more tests on the program comprises the step of:
- employing one or more identifiers of the one or more tests to retrieve the first one or more results from the one or more benchmark files.

17. The method of claim 15, wherein the step of employing the one or more portions of the one or more benchmark files to verify the second one or more results obtained from the program during execution of the one or more of the one or more tests on the program comprises the steps of:
- obtaining the second one or more results;
- retrieving the first one or more results from the one or more benchmark files;
- performing one or more comparisons of the first one or more results to the second one or more results;
- making one or more determinations of success for the one or more tests executing on the program based on the one or more comparisons; and
- providing the one or more determinations of success for the one or more tests executing on the program to a user.

18. An apparatus, comprising:
- a test control component that generates one or more benchmark files of a program through employment of one or more first results obtained from the program during a first execution of one or more tests on the program, wherein the first execution comprises a first execution of a test harness;
- wherein the test control component comprises one or more data type subroutines, a benchmark file subroutine, a printed message subroutine, and a date removal subroutine;
- wherein the one or more data type subroutines obtain the one or more first results from the program;
- wherein the printed message subroutine captures one or more messages printed to an interface component by the tests in the test harness, tests the one or more messages, and benchmarks the messages;
- wherein the date removal subroutine replaces one or more date-formatted strings with alternative strings;
- wherein the test control component is configured to display the one or more first results to a user without the user performing the one or more tests;
- wherein the test control component receives a verification of the one or more first results from the user;
- wherein the test control component stores the one or more first results upon verification of the one or more first results by the user;
- wherein the benchmark file subroutine opens an output file generated by the one or more tests, reads contents of the output file, and closes the output file;
- wherein the test control component compares the one or more first results with one or more second results obtained from the program during a second execution of the one or more tests on the program, wherein the second execution comprises a second execution of the test harness;
- wherein the test control component comprises a computer-readable signal-bearing medium;
- wherein the computer-readable signal-bearing medium comprises one or more of a floppy disk, a magnetic tape, a CD-ROM, a DVD-ROM, a hard disk drive, or electronic memory.

19. The apparatus of claim 18, wherein the one or more results comprise a first one or more results, wherein the test control component retrieves the first one or more results from the one or more benchmark files;
- wherein the test control component compares the first one or more results with a second one or more results obtained from a second execution of the one or more tests.

20. The apparatus of claim 18, wherein the test control component interacts with one or more user interfaces;
- wherein the test control component employs one or more of the one or more user interfaces to provide the one or more results to the user for verification.

* * * * *